Sept. 27, 1932.  B. KWARTIN  1,880,020
REGENERATIVE PHOTO ELECTRIC CELL CIRCUIT
Filed Dec. 2, 1927
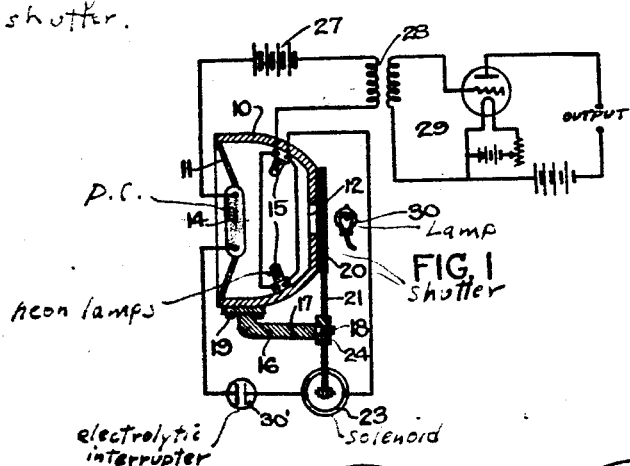
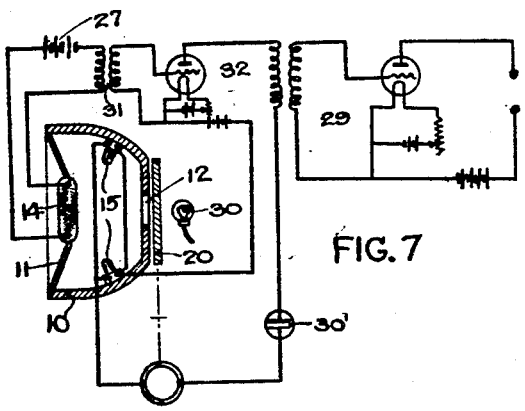
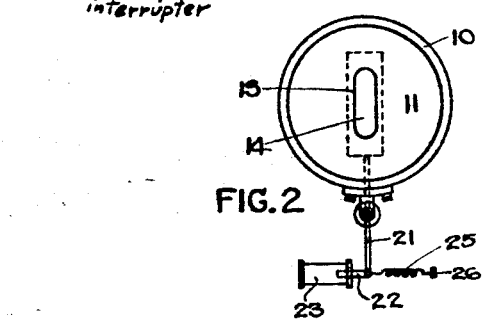
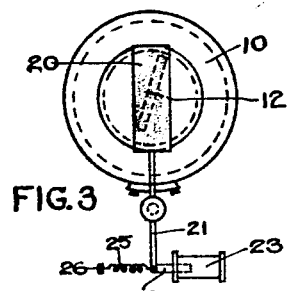
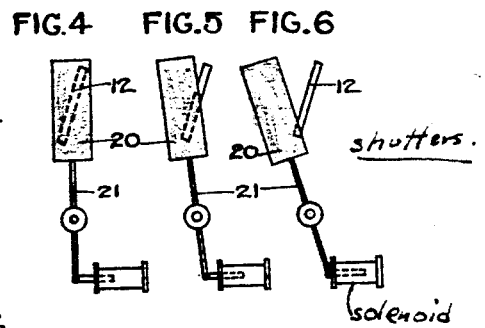
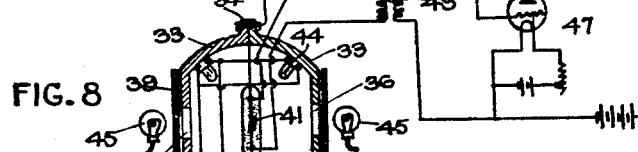
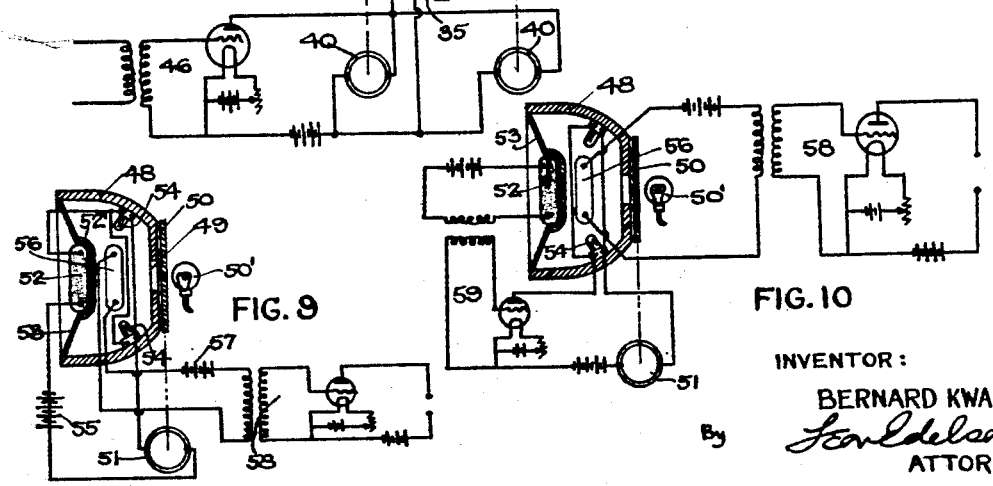
INVENTOR:
BERNARD KWARTIN
By Leon Edelson
ATTORNEY Patented Sept. 27, 1932

1,880,020

UNITED STATES PATENT OFFICE

BERNARD KWARTIN, OF PHILADELPHIA, PENNSYLVANIA

REGENERATIVE PHOTO-ELECTRIC CELL CIRCUIT

Application filed December 2, 1927. Serial No. 237,323.

This invention relates to devices for changing light variations into electrical variations and more particularly to improvements in photo-electric cells and relays, generically referred to hereinafter as "micro-phots".

Photo-electric cells, as now used for converting light energy into electrical energy, are subject to a number of disadvantages, the most important of which is that such cells do not of themselves have the property of amplifying the electrical energy to the necessary value often found desirable. This is especially noticeable where it becomes desirable to translate very weak light variations into electrical variations of sufficient strength to operate electrically responsive devices. Accordingly, one of the primary objects of this invention is the provision of a device, termed hereinafter a "micro-phot", which includes as an element thereof an ordinary photo-electric cell for converting light variations into electrical variations, in combination with additional means actuated by said electrical variations and operable to subject said photo-electric cell to the action of further light whereby to produce a final flow of current which is of greater strength than that obtainable solely from the photo-electric cell.

A still further object of the invention is the provision of a micro-phot including as one element thereof a photo-electric cell together with means energized by the flow of current produced by the action of said photo-electric cell when subjected to variations of light, the operation of the micro-phot being such that the resistance of the photo-electric cell is reduced to an irreducible minimum with the consequence that a flow of current of maximum value is thus produced.

A still further object of the invention is the provision of a primary micro-phot by means of which light variations of given intensities may be converted into electrical variations of magnitudes greater than has been heretofore possible by the sole use of a photo-electric cell, the amplified current being to all intents and purposes an exact magnified image of the current as originally set up by the action of the light variations upon the photo-electric cell.

A still further object of the invention is the provision of a secondary micro-phot comprising a pair of primary micro-phots which are so assembled as to constitute in effect a photo-electric relay for converting more or less minute electrical variations into similar variations of much greater magnitude, this amplified current being to all intents and purposes an exact magnified image of the current as originally received by the relay.

Other objects, and objects relating to details of operation and construction of the invention, will appear more fully hereinafter.

The invention consists substantially in the combination, construction, assembly, and relative arrangement of parts all as will be more fully hereinafter described, as shown in the accompanying drawing, and finally pointed out in the appended claims. It is to be understood that the invention is equally applicable for use wherever it is desired to convert light variations into electrical variations, as where it is desired to reproduce sound variations when recorded upon a motion picture film, to reproduce pictures by the process now known as "television", to calibrate the intensity of a light, or to compare the intensities or colors of two or more lights or materials, and so on. The secondary micro-phot, to be hereinafter more fully described, is more particularly adapted for building up or amplifying more or less minute electrical currents without introducing any disturbing factors which might tend to distort the amplified current wave so that the latter is no longer an exact magnified image of the original current wave.

In the accompanying drawing:

Figure 1 is a diagrammatic view of a form of primary micro-phot, showing the electrical connections therefor, the micro-phot per se being shown in section.

Figure 2 is a front elevation of the micro-phot.

Figure 3 is a rear elevation of the micro-phot shown in Figure 1.

Figures 4, 5 and 6 show, respectively, the several relative positions between the electromagnetically operated shutter and the light slit in the rear of the micro-phot.

Figure 7 is a diagrammatic view of the same form of micro-phot shown in Figure 1, but showing a modified arrangement in the electrical circuit therefor, the arrangement shown in this figure being more suitable than that shown in Figure 1 for converting weak light variations into electrical variations.

Figure 8 is a diagrammatic view showing a pair of primary micro-phots assembled in such manner as to constitute a secondary micro-phot, this latter being adapted for use in converting small electrical variations into similar variations of greater magnitude.

Figure 9 is a diagrammatic view of a modified form of micro-phot employing a secondary photo-electric cell; and Figure 10 is a diagrammatic view of the same form of micro-phot shown in Figure 9, but showing a modified arrangement in the electrical circuit therefor.

Referring now to the drawing and more particularly to Figures 1 and 4 which show in cross-section the primary micro-phot, it will be seen that this micro-phot comprises a substantially semi-spherical shell or casing 10, the front end of which is closed by the member 11 while the rear end thereof is provided with a narrow slit or opening 12, the longitudinal axis of which is inclined with respect to the vertical. The front cover plate 12 is dished inwardly as shown most clearly in Figures 1 and 4 and is provided in its center with a suitable opening 13. Supported within this opening, or directly to the rear of the opening is a photo-electric cell 14 the electrical resistance of which is variable depending upon the intensity of light to which it may be subjected. The sides of this photo-electric cell 14 are closely embraced by the walls of the opening 13 in the front cover plate 11 of the micro-phot in such manner as to preclude any possibility of light filtering past the sides of the photo-electric cell and into the interior of the body of the micro-phot.

Suitably mounted within the semi-spherical cell 10 are a plurality of neon tubes 15, these tubes being so arranged that the light emanating therefrom will be thrown upon the photo-electric cell 14. To facilitate this action the internal wall of the micro-phot shell 10 is preferably provided with a reflecting surface. While only two neon tubes 15 are shown in the arrangements of Figures 1 and 2, it is to be understood that a greater or lesser number may be employed if desired.

Secured in any preferable manner upon the bottom of the shell 10 is a bracket 16, this bracket being provided with a rearwardly extending arm 17 terminating in a substantially horizontally disposed fixed shaft or spindle 18. In this particular arrangement shown in Figures 1 and 7 the bracket 16 is secured to the shell or casing 10 by means of screws 19, but it is to be understood that the bracket may be otherwise secured in position upon the micro-phot proper or it may be mounted separately upon an adjacent structure.

Pivotally mounted upon the spindle 18 is a shutter or similar device 20, this shutter being of a width sufficient to cover the inclined slit or opening 12 in the rear wall of the micro-phot when the said cover is in the vertical position shown in Figure 4. It will be noted that the cover 20 is supported upon the upper end of a rod 21 to the lower end of which rod is pivotally secured a laterally extending armature or plunger 22. This laterally extending armature or plunger 22 is operable within a solenoid or similar device 23, this latter being designed, when energized in the manner to be hereinafter explained, to cause said plunger 22 to be drawn into said solenoid thereby causing the shutter 20 to move to one side with the result that the slit 12 will be uncovered an amount depending upon the extent of movement of said shutter. It will be understood, of course, that the rod 21 upon which the shutter 20 is mounted is provided intermediate its upper and lower ends with a collar 24 within which the spindle 18 is received, this construction permitting the shutter 20 to move about the spindle 18 depending upon the degree to which the solenoid 23 is energized. A spring 25, one end of which is secured to a fixed support 26 while the opposite end thereof is secured to the lower end of the rod 21, serves to withdraw the plunger or armature 22 from the solenoid 23 when the latter becomes de-energized.

Referring now particularly to Figure 1, it will be seen that the photo-electric cell 14 is connected across the terminals of a suitable battery 27. Connected in series with the photo-electric cell 14 in this primary circuit are the solenoid 23 and one of the neon tubes 15. The remaining neon tube or tubes are preferably connected in parallel with the first neon tube such that all of the neon tubes together act as a single large tube. This primary photo-electric cell circuit is coupled, through a transformer 28, to an amplifying circuit designated generally by the reference numeral 29. A source of light, designated generally by the reference numeral 30, is disposed to the rear of the micro-phot and in such position that the shutter 20 acts normally to intercept the rays of light emanating from said source. In order to prevent over-saturation of the photo-electric cell and to insure exact synchronous operation of the neon tubes and shutter with the photo-electric cell, it is preferable to insert in series with the neon tubes and solenoid an interrupter 30', preferably one of the electrolytic type.

The light variations which are to be converted into electrical variations are initially projected, either directly or by reflection from a suitable subject located in front of the micro-phot, upon the photo-electric cell 14. The photo-electric cell, being thus influenced by the light thrown thereon has the property of varying in resistance depending upon the intensities of the original light rays and accordingly a pulsating current is sent through the primary circuit from the battery 27. Inasmuch as the neon tubes 15 are included in this primary circuit they are caused to light up and in so doing throw their light rays upon the photo-electric cell 14, thereby still further decreasing the resistance of this photo-electric cell and causing the current in the primary circuit to be accordingly increased proportionately as the resistance in the cell 14 is decreased. At the same time that the neon tubes 15 are caused to throw their light rays upon the photo-electric cell 14, the solenoid 23 is energized to an extent sufficient to cause the plunger or armature 22 to be pulled thereinto with the result that the shutter 20 is moved into the positions shown in Figures 5 and 6. It will be seen that in these positions of the shutter 20 the slit or opening 12 will be uncovered thereby permitting light from the light source 30 to enter into the interior of the micro-phot and upon the photo-electric cell 14, the result being that the resistance of the latter is again and still further reduced. This cycle of operation continues until the resistance of the photo-electric cell has been reduced to an irreducible minimum with the consequent result that a maximum flow of current will be caused to flow through the primary coil of the transformer 28. This final maximum current is then further amplified by means of the amplifying circuit 29. It is to be understood, of course, that the extent of movement of the shutter 20 depends entirely upon the degree of energization of the solenoid 23 and that the current causing energization of the solenoid is itself built up by the light rays which are thrown upon the photo-electric cell 14 by the neon tubes 15 and the external light source 30.

Figure 7 shows a modified arrangement wherein the photo-electric cell 14 is the only element connected to the battery 27 other than the primary coil of the transformer 31. The light variations emanating from the subject disposed in front of the micro-phot are converted into electrical variations in the usual manner, the light variations which are thrown upon the photo-electric cell 14 serving to vary the resistance of the latter to produce a pulsating current in the primary circuit. This pulsating current which flows through the primary circuit is in turn sent through an amplifier designated generally by the reference numeral 32, the solenoid 23 and one of the neon tubes 15 being connected in series to the output side of the amplifying circuit 32. As in the case of the arrangement shown in Figure 1, the remaining neon tube or tubes are connected in parallel with the first neon tube so as to act as a single large tube. The operation of this micro-phot is substantially like that heretofore described, the sole difference being that in the arrangement shown in Figure 7 the pulsating current which is produced in the primary circuit is amplified before it is sent through the solenoid 23 and the neon tubes 15. Obviously the arrangement shown in Figure 7 is especially applicable where the original light variations are too weak to produce any appreciable current variations in the primary circuit.

Figure 8 illustrates an arrangement for transforming electrical variations into similar variations of greater magnitude. The arrangement shown in Figure 8 might more properly be termed a photo-electric relay because in the final analysis it does and is intended to perform as a relay. It will be seen that this relay consists of a pair of substantially semi-spherical shells 33, each having an annular flange 34 around its open side. The shells 33 are assembled with their open sides together by means of screws 35 passing through said flange 34, the result being that a substantially spherical hollow shell is produced. Exactly as in the case of the primary micro-phot, this secondary micro-phot is provided in each of its diametrically opposed walls with a narrow slit or opening 36, the longitudinal axis of which is inclined with respect to the vertical. Brackets similar to bracket 16 shown in Figures 1 and 7 are mounted in any suitable manner upon the bottom of this secondary micro-phot to provide suitable spindles upon which is journalled the shutters 39. A solenoid 40 is provided for each of these shutters 39, the shutters being operable by the action of said solenoids upon plungers or armatures similar to that shown in connection with the primary micro-phots heretofore described.

Suitably mounted within the interior of the secondary micro-phot is a photo-electric cell 41, this cell being connected to a battery 42 through the primary of a transformer 43. Also mounted within the secondary micro-phot are a plurality of neon tubes 44, these tubes being preferably connected in parallel with each other for the reason already pointed out in connection with the primary micro-phots. As in the case of the primary micro-phots there is provided at each side of the secondary micro-phot an external source of light, designated generally by the reference numeral 45, these sources of light being energized as in the former instances from separate sources of supply (not shown). The original current which is to be transformed into current of greater magnitude is initially sent through an amplifying circuit designated generally by the reference numeral 46, this initially amplified current being then sent into the solenoids 40, which latter are preferably connected in parallel to the output terminals of the circuit 46. The several neon tubes 44 are also connected to the output terminals of this same circuit 46.

Depending upon the strength of the current flowing through the solenoids 40, the shutters 39 will be each actuated to an extent sufficient to uncover the openings 36 in the walls of the secondary micro-phot. Immediately that these openings are uncovered light rays from the sources of light 45 will be permitted to pass into the interior of the sphere and upon the photo-electric cell 41 thereby permitting the battery 42 to send a pulsating current through the primary coil of the transformer 43. At the same time that light from the external sources 45 is thrown upon the photo-electric cell through the uncovered openings 36, the several neon tubes 44 located within the secondary micro-phot will have been energized by the current flowing from the amplifying circuit 46 to such an extent that they will have become illuminated sufficiently to also throw light rays upon the photo-electric cell 41. The resistance of the latter will be accordingly still further decreased, thereby permitting a still greater flow of current through the primary coil of the transformer 43. The current so produced is then amplified in the final amplifying circuit, designated generally by the reference numeral 47.

Figures 9 and 10 show modified forms of micro-phots, in each of which is included a secondary photo-electric cell arranged to be independently influenced by the rays of light emanating from a separate source of light. In each instance, however, the electrical variations set up by the secondary cells are in synchronism with those set up by the primary photo-electric cells, these latter being subjected to the light rays emanating from the subject in exactly the same manner as has been hereinbefore described in connection with the micro-phots shown in Figures 1 and 7.

Referring to Figure 9, it will be seen that the modified form of micro-phot comprises a substantially semi-spherical casing 48 which is provided in its rear wall with a small slit or opening 49 normally covered by the shutter 50. When this shutter 50 is moved to one side, the light rays from the external source of light 50' may pass through the opening 49, the movement of the shutter 50, and accordingly the amount of light passing through the opening 49, being dependent upon the degree of energization of the solenoid 51. Up to this point the micro-phots of Figures 9 and 10 are substantially similar in construction to those of Figures 1 to 7, inclusive. It will be observed, however, that in each of the modified micro-phots, the primary photo-electric cell 52 (this being the cell which is influenced by the fluctuating light rays emanating or reflected from the subject) is received within a suitable pocket 52' formed in the cover plate 53, the arrangement being such that the cell 52 is influenced solely by the rays of light coming from the subject.

Arranged within the casing 48 are a plurality of neon tubes 54, these tubes being connected in parallel with each other to constitute in effect a single large tube. The primary cell 52 is connected to the battery 55 in series with the solenoid 51 and the group of neon tubes 54. Also arranged within the casing 48 is a secondary photo-electric cell 56, this latter cell being independent of the primary cell 52 and being connected to its own battery 57 and amplifier 58.

Depending upon the intensity of the light rays which are directed upon the primary cell 52, electrical variations of corresponding strength will be set up in the primary cell circuit. These electrical variations will cause the neon tubes to glow and at the same time the solenoid 51 will be energized an amount sufficient to produce an initial movement of the shutter 50, thereby permitting light rays from the external source of light 50' to be thrown upon the secondary cell 56. The combined effect of the light emanating from the neon tubes 54 and the external source 50' and directed upon the secondary cell 56 will result in the resistance of the latter being markedly decreased in proportion to the intensity of the light rays emanating from the subject and directed upon the primary cell 52. This marked decrease in resistance of the secondary cell is of course due to the influence of the light rays coming from the neon tubes 54 and the external source of light 50', the result being that an exact magnified image of the original electrical variations is produced in the circuit of the secondary cell 56. These magnified electrical variations are still further amplified by the amplifier 58.

Where the initial light variations are quite feeble it may be desirable to employ the arrangement shown in Figure 10. This latter 1,880,020 arrangement is similar in all respects to that shown in Figure 9 with the exception that the electrical variations as originally set up in the circuit of the primary cell 52 are sent through an amplifier 59 before energizing the neon tubes 54 and the solenoid 51.

It is to be understood that various changes may be made from time to time in the arrangements and methods herein shown and described without departing from the real spirit or principles of the invention, and it is accordingly intended to claim the same broadly, as well as specifically, as indicated in the appended claims.

What is claimed as new and useful is:

1. In an apparatus for converting light variations into electrical variations, a housing containing a photo-electric cell and one or more gaseous tubes, said photo-electric cell being so arranged within the housing that it is initially influenced by fluctuating rays of light emanating or reflected from a subject located in front of said housing and independently of said gaseous tubes, and a battery connected in series with said photo-electric cell and operative to energize said gaseous tubes to produce an additional source of light for influencing said photo-electric cell.

2. In an apparatus for converting fluctuating light rays into electrical variations, a photo-electric cell arranged to be influenced by said fluctuating light rays, a plurality of auxiliary elements for emitting light rays operatively associated with said photo-electric cell, said elements being energized by the initial current set up in the photo-electric cell for directing additional rays of light of varying intensity upon the opposite side of said photo-electric cell, the effect of these elements being to still further decrease the resistance of said photo-electric cell whereby to produce amplified electrical variations corresponding to the light variations emanating or reflected from said subject.

3. In an apparatus for converting light variations into electrical variations, a photo-electric cell arranged to be influenced by the fluctuating rays of light emanating or reflected from a subject located to one side of said cell, a plurality of neon tubes arranged to throw additional light rays upon the opposite side of said photo-electric cell independently of and in addition to those produced by said subject, said photo-electric cell and neon tubes being commonly connected to a suitable source of current such that the intensity of the light rays thrown off by said neon tubes is dependent upon the electrical variations initially produced by the action of the light rays directed upon the photo-electric cell from the subject.

4. In an apparatus for converting light variations into electrical variations, a photo-electric cell arranged to be influenced by the light rays emanating or reflected from a subject located to one side of said cell, the resistance of said cell being varied in accordance with the intensities of said light rays, a plurality of neon tubes connected in circuit with said photo-electric cell and with a source of current whereby to produce additional rays of light for influencing said photo-electric cell, the additional light rays emanating from said neon tubes being produced independently of those emanating or reflected from said subject and being operable to still further decrease the resistance of said photo-electric cell in accordance with their intensities.

5. In an apparatus for converting light variations into electrical variations, a light responsive element arranged to be initially influenced by the fluctuating rays of light emanating or reflected from a subject located in front of said element, an electrical circuit in which said element is included and wherein electrical variations are set up corresponding in frequency to the light variations influencing said element, and means influenced by said initial electrical variations for introducing additional light variations whereby to produce final amplified electrical variations of frequencies corresponding to those of said initial electrical variations, said means being separate and distinct from and operable independently of said subject.

6. In an apparatus for converting light variations into electrical variations, a light responsive element arranged to be initially influenced by the fluctuating rays of light emanating or reflected from a subject located in proximity to said element, an electrical circuit in which said element is included and wherein electrical variations are set up corresponding in frequency to the light variations influencing said element, a solenoid energized by the current set up in said circuit, a source of light arranged to influence said element, and a light intercepting screen between said light and said element, said screen arranged to be moved out of light intercepting position in a degree responsive to the energization of said solenoid.

7. In an apparatus for converting light variations into electrical variations, a casing, a light responsive element housed within said casing, a plurality of light producing elements also housed within said casing, said elements being arranged to throw the light rays emanating therefrom upon said light responsive element to thereby vary the resistance of the latter, and means associated with said light responsive element for setting up primary current variations corresponding to certain initially produced primary light variations, said primary current variations being effective to energize said light producing elements whereby to cause the latter to produce corresponding secondary light variations for influencing the resistance of said light responsive element.

8. In an apparatus for converting light variations into electrical variations, a casing, a light responsive element housed within said casing, said casing being provided with an opening in one wall thereof, an independently energized secondary light source arranged to throw light rays into the interior of said casing through said opening, a shutter arranged to normally intercept the light rays emanating from said light source, means associated with said light responsive element for setting up current variations corresponding to certain initially produced primary light variations, and electro-magnetic means arranged to move said shutter out of light intercepting position upon energization by said current, the extent of movement of said shutter being dependent upon the degree of energization of said electro-magnetic means.

9. In a photo-electric relay for converting more or less minute electrical variations into similar variations of greater magnitude, a hollow casing, a light responsive element arranged within the interior of said casing and adapted to be influenced by a primary source of fluctuating light rays, a plurality of light producing elements controlled by said light responsive element also arranged within said casing, said elements constituting a secondary source of fluctuating light rays to which said light responsive element is subjected, an auxiliary light source positioned to affect said light responsive element, and means controlled by said light responsive element for varying the effect of said auxiliary light source on said light responsive element synchronously with the variations of said primary source whereby to reduce the electrical resistance of the light responsive element to practically an irreducible minimum.

In testimony whereof, I have hereunto affixed my signature.

BERNARD KWARTIN.